Patented Nov. 7, 1939

2,178,585

UNITED STATES PATENT OFFICE 2,178,585

MANUFACTURE OF PARA DIAZONIUM TERTIARY AMINES

Walker M. Hinman, Winnetka, and Walter G. Hollmann, Chicago, Ill.

No Drawing. Application March 15, 1937, Serial No. 130,866. Renewed February 6, 1939

20 Claims. (Cl. 260—141)

The present invention relates to the manufacture of a para-diazonium salt from an aromatic tertiary amine, and has for its object the attachment of a nitrogen atom, derived from mineral acid, in the para position to the nitrogen of said amine, in a simple procedure which also develops the diazo group.

The object of the invention is to introduce a diazonium radicle directly into a benzene nucleus having a free para position with respect to a tertiary nitrogen atom, by the action of nitrous acid in a one-step operation on a suitable reactive form of the tertiary amine. Various other objects and advantages of the invention will be apparent from the following description and explanation of the invention.

The present invention is based upon a discovery that tertiary amines of a certain order may be treated with excess of nitrous acid over that necessary to form a nitroso group in the para position, and the excess is effective to convert the nitroso group to a diazo group, apparently going through the reduction to an amino group and through a diazotization of such amino group.

The attachment of a nitroso group to aromatic tertiary amine bases by use of nitrous acid has been accomplished heretofore, and it is a standard text-book reaction for the making of para nitroso compounds, being usually exemplified by reference to the treatment of dimethyl aniline, and diethyl aniline. No literature on higher substituted anilines or other aromatic amines has been found. When the indicated reaction was tried on higher alkyl homologs of diethyl aniline it did not appear to work as expected and no sufficient quantity of the nitroso compound was formed to warrant isolation. Certain aromatic nitroso compounds have heretofore been treated with nitrous acid forming aromatic diazonium salts. This reaction seems to be little known or utilized, and the only reference known to it is Cain "The Chemistry of the Diazo Compounds" (1908) page 17.

So far as known, the literature indicates no attempts have ever been made to combine the two mentioned reactions. Taking the standard process for the nitrosoation of dimethyl aniline and diethyl aniline, it is a fact that the nitroso compounds thereof are not subject to the second reaction above discussed, at least under the conditions directed and employed for forming the nitroso compound with nitrous acid. It is for this reason that the text book preparation of the para nitroso dimethyl aniline or diethyl aniline is so successful and easily carried out. Heretofore, to reduce the nitroso groups of these materials to a diazo compound, it has been necessary to subject them to nascent hydrogen, such as that produced by the action of acid on metal, for example, hydrochloric acid and zinc. This results in the formation of the primary amine hydrochloride which is suitable for the diazotization process, by means of a second use of nitrous acid.

Following the assumption that higher homologs of dimethyl aniline and diethyl aniline would act the same as the said lower members of the series, one would expect to form the nitroso compounds by use of nitrous acid, then to reduce by nascent hydrogen, and then diazotize the resulting primary amine salt in the regular way with more nitrous acid. As above stated, the attempts to follow the first step of this procedure were considered a failure on account of the small yield of nitroso compound that could be isolated. This attempt naturally called for using just enough nitrous acid to effect the nitrosoation of the amine. Careful study of the reaction, however, showed that as the para nitroso compound was formed it was destroyed. It was then discovered that the product of destruction most unexpectedly had the properties of a diazonium salt.

Further study led to the consideration that the first-formed nitroso compound was being reduced and diazotized by the nitrous acid intended for the nitrosoation. By adding a sufficient excess of nitrous acid to accommodate the suspected condition, it was found that any of the selected di-substituted aromatic amines could be readily nitrosoated and doubtlessly in the para position; that at the same time the nitroso compound could be reduced; and that the resulting amine was simultaneously diazotized to form a diazonium salt. Where the nitrous acid was formed by the addition of sodium nitrite to a hydrochloric acid solution of the tertiary aromatic amine, the latter could be readily and efficiently converted into a diazonium salt in a one-step process. This product corresponds in all respects in coupling reactions to form dyestuffs of color clearly indicating that the diazo group has been directly introduced in the aromatic nucleus at a position para to the tertiary nitrogen.

The reaction so far as known is new and distinctive for a wide variety of di-substituted amines. By applying the successful procedure already established to the more commonly available dimethyl aniline and diethyl aniline, it has been found that the reaction occurs to only a partial extent, and that a considerable amount of para nitroso compound is formed and retained. It has been established that the length of chain of the alkyl groups of the tertiary amine has a strong influence on the reaction, and that the influence is clearly exhibited as perfect in the series beginning with di-n-propyl and di-isopropyl aniline. Between the group consisting of dimethyl aniline and diethyl aniline and the group consisting of the higher homologs beginning with dipropyl aniline, there are methyl-n-propyl aniline, methyl-iso-propyl aniline and the two corresponding ethyl propyl anilines, all of which act like dipropyl aniline, the heavier group imparting its characteristics to the molecule.

The invention has been carried out on dipropyl, dibutyl, diamyl, dihexyl, dioctyl, dilauryl, dibenzyl, dicyclohexyl anilines and many of their isomeric chain forms, and also upon disubstituted anilines with unlike groups, such as methyl-n-propyl, methyl-iso-propyl, ethyl-n-propyl, ethyl-iso-propyl, ethyl-benzyl, amyl-benzyl, propyl-heptyl, ethyl-octyl, butyl-hexyl, butyl-cyclohexyl anilines, and some of their isomeric forms. The reaction is therefore applicable to the homologous symmetrical dialkyl anilines higher than diethyl aniline, the unsymmetrical dialkyl anilines having at least one alkyl radicle higher than the ethyl radicle, the symmetrical diaralkyl anilines, upon the alkyl-aralkyl anilines, and upon alicyclic variations of these such as the cyclohexyl radicle. It appears that where the amino group (NH$_2$—) is weighted by two organic radicles at least one of which exceeds the weight of an ethyl radicle, the higher tertiary aromatic amine is subject to the reaction, where its para position to the amino group is open.

Where alkyl groups are involved, they may be either the normal chain or branch chain, or mixtures. The weight of the chain rather than its form seems to be an influencing factor, to be discussed hereinafter. It seems to weaken the nitroso group so that it is more readily reduced by the nitrous acid under the same conditions which form the nitroso group from nitrous acid. But since aromatic primary amines are readily diazotized by nitrous acid, the amine does not persist as such, changing rapidly to the diazonium salt.

Some diazonium salts readily decompose at temperatures below normal room temperature, as is well known by the practice of having ice present in many diazotization processes. Other and more highly complicated amines form more stable diazonium salts in solution, which can readily exist at normal room temperature or above it. It is a characteristic of many of the compounds that can be made by the present process that the diazonium salts are stable in acid solution at normal room temperature or above it. The best results with the present invention have been obtained at temperatures from 25° C. to 30° C., which indicates slight heating above normal room temperature.

It has also been found that increasing complexity in the like or unlike chains of the tertiary amine, or in the ring of the aromatic group of the tertiary amine, requires variations in the procedure to get the ultimate result.

Procedure A

The following is a general procedure for arriving at a diazonium salt solution using those tertiary amines which are most readily submissive to the present invention. Parts are given by weight. To 1 part of the tertiary amine add 12 parts of concentrated hydrochloric acid (37%). This usually forms solid hydrochloride. Heat may be required if necessary to effect combination. Then add 65 parts of water to dissolve a substantial portion of the hydrochloride. Then at room temperature of about 25° C. to 30° C., subject also to both higher and lower temperatures, add 2 parts of sodium nitrite crystals, and let stand for 12 hours. In this period it may be seen that a nitroso compound forms and disappears. The mass is then filtered to remove undesirable residue. The product contains a para diazonium chloride and may be used directly with a coupling agent to form a dyestuff. Many of the compounds so obtained form water-insoluble diazonium double salts with metal salts, which may be filtered out as stable diazo compounds. One well known method is to add stannic chloride, of which an equivalent of 2 parts of anhydrous salt are sufficient in this procedure, along with 10 parts of sodium chloride to salt out the diazonium chlorostannate.

Procedure B 10 parts of tertiary amine in 100 parts of dry ethyl ether is treated with dry hydrogen chloride until saturated. This forms an amine hydrochloride, sometimes as a crystalline solid, or as an oily material, or as a solute, or a combination of these. The ether is evaporated to recover the hydrochloride of the tertiary amine as a crystalline, amorphous, or gummy mass. This is then treated in the same way as the initial tertiary amine set forth in Procedure A.

Such preliminary treatment is required because some tertiary amines do not readily form hydrochloride in the more simple procedures where more water is present.

Procedure C

The hydrochloride of the tertiary aromatic amine is made according to the method of Procedure B, but instead of using it by Procedure A, it is dissolved in 65 parts of glacial acetic acid, with 10 parts of water and 12 parts of concentrated hydrochloric acid (37%). Then 2 parts of sodium nitrite crystals are added and the mass allowed to stand for 12 hours at ordinary room temperature. After this, the tin chloride as in Procedure A can be added directly to this acid mass, or the same may be treated in any desired way to utilize or obtain the diazonium compound therein.

Discussion

The more fatty become the chains of the substituted groups of the tertiary amine, the more difficult it is to form the hydrochloride, and to keep the same when made, in reactive form for the process. The simpler tertiary amines which are subject to the process of this invention form the hydrochlorides with strong aqueous hydrochloric acid and the same are stable in more aqueous dilutions. Such materials are useful in Procedure A. Then there is encountered a group which does not readily form the hydrochloride with 37% hydrochloric acid. Procedure B merely exemplifies one procedure for forming hydrochlorides which when formed are stable in aqueous solution. Then there is encountered a group which forms hydrochlorides with difficulty which when formed are not so stable, or water-soluble, or reactive, for the present invention in a highly aqueous medium, but are stable, soluble and reactive in a less aqueous acid medium such as that exemplified in Procedure C.

The diazonium salt as a solution or solid or liquid may be used directly to couple with any suitable agent to form a dyestuff, in the well known manner of coupling to form azo dyes, or it may be treated to convert the diazo linkage into a phenol or other group. By using the diazonium salts obtained by applying this invention, several new series of dyestuffs may become developed to be commercially practicable. It is stated that there can be new series of dyestuffs, because the various di-substituted amines which can be used in this invention have not heretofore been described in the literature, and are therefore believed to have been unavailable heretofore through simple procedure for such conversion into dyestuffs, or for consideration of such possibilities.

The diazonium salts may be preserved in solution or in liquid or solid form for future use. Owing to the great stability-against-decomposition, of the diazonium salts obtained by the present invention, these salts in solution may be treated like other stable diazonium salts to form separable stable compounds. One well known way is to add stannic chloride to the diazonium salt solution resulting from the precedures above described, whereby a gummy, crystalline or oily double salt with stannic chloride may be formed, known as the chloro-stannate salt of the particular diazonium compound used. This is an excellent way to purify the diazonium product from impurities that may be left in the preparation by any of the above procedures. Such chloro-stannate salts may be suitably separated from the residual solution, and when they are crystals, they may be dried and preserved for future use, as a purified form of the product. This can then be coupled as desired with any one of many coupling agents to form dyestuffs, or otherwise treated to form various intermediates which may be obtained by reaction through diazonium salts.

The following table gives a number of tertiary amines which have been used in this invention, the procedure used with each, the character of the tin chloride salt which may be isolated, and the color of the dyestuff resulting from coupling with an alkaline solution of phloroglucinol. It is to be understood that other coupling agents may be used which may result in different shades of black or in entirely different colors, as is well known in the art.

*Table I*

| Tertiary amine | Procedure | Character of SnCl$_4$ double salt | Color of dyestuff with alkaline phloroglucinol |
|---|---|---|---|
| Methyl-n-propyl aniline | A | Gummy | Dark brown. |
| Methyl-iso-propyl aniline | A | do | Brownish black. |
| Ethyl-n-propyl aniline | A | do | Dark brown. |
| Ethyl-iso-propyl aniline | A | do | Brownish black. |
| Di-isopropyl aniline | A | do | Purple black. |
| Di-n-propyl aniline | A | Crystal | Do. |
| Di-n-butyl aniline | A | do | Blue black. |
| Di-isoamyl aniline | A | do | Black. |
| Di-n-amyl aniline | B | do | Do. |
| Di-n-hexyl aniline | B | do | Do. |
| Di-cyclohexyl aniline | C | Oil | Do. |
| Di-octyl aniline* | C | do | Do. |
| Di-lauryl aniline | C | do | Do. |
| Di-benzyl aniline | A | Crystal | Do. |
| Ethyl-benzyl aniline | A | do | Do. |
| Iso-amyl-benzyl aniline | A | do | Do. |
| Ethyl-octyl aniline* | C | Oil | Do. |
| N-propyl-n-heptyl aniline | C | do | Do. |
| N-butyl-n-hexyl aniline | B (but C best) | Gummy | Do. |
| N-butyl cyclohexyl aniline | B | Oil | Do. |
| Di-isoamyl aniline ortho ethyl ether | A | Crystal | |
| Ortho-chloro-di-isoamyl aniline | A | Oil | Black. |
| 2,6-dimethyl di-isoamyl aniline | A | do | |

*The octyl isomer is 2-ethyl hexyl.

The reaction proceeds easily but slowly at ordinary temperatures over a period of time when an excess of nitrous acid is present. Theoretically four moles of nitrous acid are required for conversion of one mole of the tertiary amine. An excess of nitrous acid is used because of danger of loss by mechanical escape of nitrous fumes from the acid liquid medium during the period of the reaction. Excess does no harm.

The tertiary amine as a derivative of aniline may be referred to for convenience as have the formula $C_6H_5NRR'$, in which R is a hydrocarbon radicle having more than 2 carbon atoms, and R' is a hydrocarbon atom having at least 1 carbon atom. The character of the hydrocarbon and the manner in which different hydrocarbon radicles are combined under this designation seems to have no critical effect in the invention, in its broadest aspect, of course discounting the specific requirements for different procedures within the broad scope of the invention.

From the large variety of radicles used in combinations of R and R', it is obvious that the invention is not to be considered as limited to or by the examples above given. Changes and modifications thereof are contemplated as falling within the scope of the appended claims.

We claim:

1. The process of treating a tertiary aromatic amine which has a free para position, and which has its nitrogen atom bearing one hydrocarbon radicle having at least 3 carbon atoms and another hydrocarbon radicle having at least 1 carbon atom which comprises subjecting the tertiary amine in the form of an amine salt thereof in an acid medium to the action of nitrous acid sufficient for the reaction of 1 mol of tertiary amine with 4 mols of nitrous acid, whereby a para diazonium salt of said tertiary amine is formed.

2. The process of treating a tertiary aromatic amine which has a free para position, and which has its nitrogen atom bearing one hydrocarbon radicle having at least 3 carbon atoms and another hydrocarbon radicle having at least 1 carbon atom which comprises subjecting the tertiary amine in the form of an amine salt thereof in an acid medium to the action of nitrous acid sufficient for the reaction of 1 mol of tertiary amine with 4 mols of nitrous acid, whereby a para diazonium salt of said tertiary amine is formed, and coupling said diazonium compound in alkaline solution with an azo-dye-forming component.

3. The process of treating a tertiary aromatic amine which has a free para position, and which has its nitrogen atom bearing one hydrocarbon radicle having at least 3 carbon atoms and another hydrocarbon radicle having at least 1 carbon atom which comprises subjecting the tertiary amine in the form of an amine salt thereof in an acid medium to the action of nitrous acid sufficient for the reaction of 1 mol of tertiary amine with 4 mols of nitrous acid, whereby a para diazonium salt of said tertiary amine is formed, and coupling said diazonium compound in alkaline solution with a phenolic component to form an azo-dyestuff.

4. The process of treating a tertiary aromatic amine which has a free para position, and which has its nitrogen atom bearing one hydrocarbon radicle having at least 3 carbon atoms and another hydrocarbon radicle having at least 1 carbon atom which comprises subjecting the tertiary amine in the form of an amine salt thereof in an acid medium to the action of nitrous acid sufficient for the reaction of 1 mol of tertiary amine with 4 mols of nitrous acid, whereby a para diazonium salt of said tertiary amine is formed, and combining said diazonium salt with a metal salt capable of forming therewith a separable complex of diazonium salt and the metal salt, and removing said complex from the medium in which it is formed.

5. The process of treating a tertiary aromatic amine which has a free para position and which has its nitrogen atom bearing one hydrocarbon radicle having at least 3 carbon atoms and another hydrocarbon radicle having at least 1 carbon atom, which comprises forming a hydrochloride of said tertiary amine, subjecting said hydrochloride in an acid medium to the action of nitrous acid in sufficient quantity for the reaction of 1 mol of tertiary amine with 4 mols of nitrous acid, whereby a para diazonium salt of said tertiary amine is formed.

6. The process of treating a tertiary aromatic amine which has a free para position and which has its nitrogen atom bearing one hydrocarbon radicle having at least 3 carbon atoms and another hydrocarbon radicle having at least 1 carbon atom, which comprises forming a hydrochloride of said tertiary amine in a highly aqueous hydrochloric acid solution, and subjecting said hydrochloride in said solution to the action of nitrous acid in sufficient quantity for the reaction of 1 mol of the tertiary amine with 4 mols of nitrous acid, whereby a para diazonium chloride of said tertiary amine is formed.

7. The process of treating a tertiary aromatic amine which has a free para position and which has its nitrogen atom bearing one hydrocarbon radicle having at least 3 carbon atoms and another hydrocarbon radicle having at least 1 carbon atom, which comprises forming a hydrochloride of said tertiary amine in a non-aqueous medium, and subjecting said hydrochloride in a highly aqueous hydrochloric acid solution, in which the hydrochloride is stable, to the action of nitrous acid in sufficient quantity for the reaction of 1 mol of the tertiary amine with 4 moles of nitrous acid, whereby a para diazonium chloride of said tertiary amine is formed.

8. The process of treating a tertiary aromatic amine which has a free para position and which has its nitrogen atom bearing one hydrocarbon radicle having at least 3 carbon atoms and another hydrocarbon radicle having at least 1 carbon atom, which comprises forming a hydrochloride of said tertiary amine in a non-aqueous medium, and subjecting said hydrochloride in a slightly aqueous acid medium, in which said hydrochloride is stable, to the action of nitrous acid in sufficient quantity for the reaction of 1 mol of the tertiary amine with 4 mols of nitrous acid, whereby a para diazonium chloride of said tertiary amine is formed.

9. The process of treating a tertiary amine of the formula $C_6H_5NRR'$ in which R is a hydrocarbon radicle of more than 2 carbon atoms and R' is an organic hydrocarbon radicle of at least 1 carbon atom, which comprises subjecting the tertiary amine in the form of an amine salt thereof in an acid medium to the action of nitrous acid sufficient for the reaction of 1 mol of tertiary amine with 4 mols of nitrous acid, whereby a para diazonium salt of said tertiary amine is formed.

10. The process of claim 9 wherein R and R' are identical aliphatic hydrocarbon radicles having more than 2 carbon atoms.

11. The process of claim 9 wherein R is an aliphatic hydrocarbon radicle having more than 2 carbon atoms.

12. The process of claim 9 wherein R is an aralkyl hydrocarbon radicle.

13. The process of claim 9 wherein R and R' are identical aralkyl hydrocarbon radicles.

14. The process of claim 9 wherein R and R' are identical alicyclic hydrocarbon radicles.

15. The process of claim 9 wherein R is an alicyclic hydrocarbon radicle.

16. A method for the direct introduction into an aromatic ring of a diazo linkage —N=N—, which comprises subjecting a tertiary aromatic amine with a benzene ring having a free para position with respect to the nitrogen atom, which atom bears one hydrocarbon radicle of at least one carbon atom and another hydrocarbon radicle of at least three carbons, to the action of sufficient nitrous acid in an acid medium to effect the theoretical steps of nitrosoation at the para position, reduction thereof to an amine, and diazotization of said amine, whereby a para diazonium salt is formed in a one-step operation.

17. The method of making a para diazonium compound of a disubstituted aromatic amine having a benzene nucleus and the groups R and R' attached to the nitrogen, in which R is a hydrocarbon radicle having more than 2 carbon atoms and R' is a hydrocarbon radicle having at least 1 carbon atom, which comprises subjecting the amine in the form of an acid salt thereof to the action of an excess of nitrous acid in an acid liquid medium at an ordinary temperature for a prolonged period of time, whereby to form therein a diazonium salt.

18. The process of making a diamyl aniline diazonium salt which comprises subjecting an acid solution of a diamyl aniline to the action of nitrous acid in sufficient quantity for the reaction of 1 mol of the diamyl aniline with 4 mols of nitrous acid, whereby a para diazonium salt of diamyl aniline is formed.

19. The process of making a dibenzyl aniline diazonium salt which comprises subjecting an acid solution of a dibenzyl aniline to the action of nitrous acid in sufficient quantity for the reaction of 1 mol of the dibenzyl aniline with 4 mols of nitrous acid, whereby a para diazonium salt of dibenzyl aniline is formed.

20. The process of making an ethyl-benzyl aniline diazonium salt which comprises subjecting an acid solution of ethyl-benzyl aniline to the action of nitrous acid in sufficient quantity for the reaction of 1 mol of the ethyl-benzyl aniline with 4 mols of nitrous acid, whereby a para diazonium salt of ethyl-benzyl aniline is formed.

WALKER M. HINMAN.
WALTER G. HOLLMANN.